May 26, 1925.
P. W. MOSHER
1,539,500
AUTOMATIC ELECTRIC BRAKE SET
Filed Oct. 17, 1924
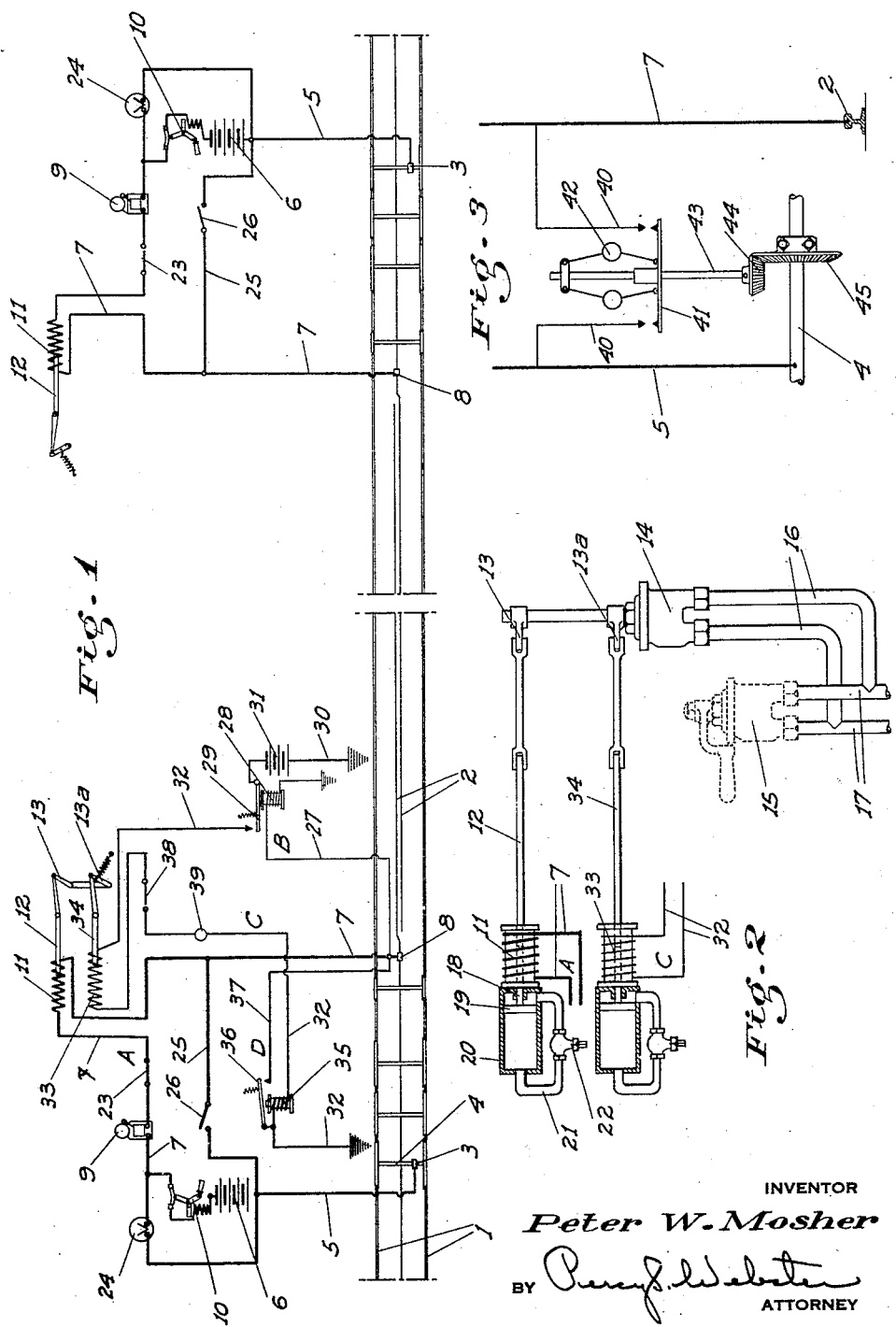
INVENTOR
Peter W. Mosher
BY
ATTORNEY Patented May 26, 1925.

1,539,500

UNITED STATES PATENT OFFICE.

PETER W. MOSHER, OF STOCKTON, CALIFORNIA.

AUTOMATIC ELECTRIC BRAKE SET.

Application filed October 17, 1924. Serial No. 744,175.

*To all whom it may concern:*

Be it known that I, PETER W. MOSHER, a citizen of the United States of America, residing at Stockton, county of San Joaquin, State of California, have invented certain new and useful Improvements in Automatic Electric Brake Sets; and I do declare the following to be a full, clear, and exact description of same, reference being had to the accompanying drawings, and to the characters of reference marked thereon, which form a part of this application.

This invention relates to improvements in railway equipment, and especially to automatic brake setting systems, installed on the locomotives or other power vehicles on railways to warn the respective engineers of two such vehicles when they are in the same block, and to automatically cause a brake application to be made on the vehicles.

The present invention particularly represents an improved structure over my Patent No. 1,119,306, granted to me December 1st, 1914, and also over my pending application for patent, Serial No. 730,901, filed August 8th, 1924.

In the previous devices if the main brake applying circuit on one engine was out of order, not only would the brakes on that engine not be set but they would not be set on another engine in the same block either.

My main object now is to provide an auxiliary brake setting circuit means which will automatically function whenever the main circuit is out of order, to not only immediately and in all cases apply the brakes on the engine on which the auxiliary circuit is mounted, but it will also cause the brakes to be applied on another engine if the latter is in the same block, and regardless of whether said engine has either the auxiliary or the latest type of main circuit system or not.

Another object is to arrange the auxiliary circuit in such a manner that the circuit therethrough will be closed if the main circuit is out of order, regardless of whether the engine is in the shops, roundhouse, or on the main line; since this auxiliary circuit has no connection with the third rail used along the main line. Thus an engine cannot leave the round house or elsewhere unless the main circuit is in working order.

A further object is to provide a simple and slower acting mechanism for actually applying the brakes than that used heretofore thus avoiding a too quick application of the brakes.

I have also provided a speed governor device, operated in connection with the main circuit, which will automatically put the brakes on the engine on which the device is mounted, when the speed of said engine exceeds a predetermined maximum. The brakes, however, will be immediately released as soon as the speed drops to within said maximum limit, and of course acts only on the individual engine, having no connection with any other engine.

A further object of the invention is to produce a simple and relatively inexpensive system, and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views:

Fig. 1 is a diagram showing my improved system as applied to two engines, one engine, however, being shown with the main circuit system only.

Fig. 2 is an enlarged diagrammatic view of the air-brake valve actuating mechanism.

Fig. 3 is a conventional or diagrammatic view showing a speed governor attachment mounted in connection with one of the driving axles of the engine, and interposed in the main circuit.

Referring now more particularly to the characters of reference on the drawings, my improved system when complete practically comprises four circuits—the main circuit A, a shunt circuit B controlling the auxiliary circuit C and closed as long as the main circuit is unbroken, and a further shunt circuit D controlled and closed only by the closing of the auxiliary circuit, which in turn is only closed when the main circuit is broken.

In Fig. 1, the numeral 1 denotes the usual rails on which the vehicles travel, and 2 the auxiliary third rail or other suitable current conducting member insulated from the rails 1. This third rail is divided into separated lengths, the adjacent ends of which extend side by side in parallel but spaced and insulated relation to each other for a certain distance as shown.

The main circuit A of my system comprises, for and on each locomotive, a contact 3 or ground on an axle 4 or other member of the locomotive, so that contact is thus indirectly and continuously made with the rails 1. A wire 5 from the contact 3 leads to one terminal of a battery 6 or other source of current carried on the locomotive, while from the other terminal of the battery a wire 7 leads to a shoe or other contact member 8 contacting with the third rail 2 at all times. Interposed in the wire 7 is a bell 9 or the like. Between the bell and the battery is an overload circuit breaker 10 to protect the battery and other parts. Beyond the bell a solenoid 11 is interposed in the wire 7, whose movable core 12 is connected to the operating handle 13 of an air-brake valve 14. This valve is a duplicate of the usual engineer's brake-valve 15 mounted on the engine (see Fig. 2).

The air-pipes 16 from the valve 14 are connected to the corresponding pipes 17 of the valve 15 so that either valve may be operated to apply the brakes without disturbing the other.

This arrangement avoids any direct connection of my system with the usual engineer's brake-valve, as is considered necessary by the requirements of the commission whose approval is necessary in connection with the installation of such systems.

The core 12 has a rearward extension 18 of a suitable material not affecting the action of the solenoid on the core itself. This extension projects through the solenoid and has on its rear end a piston 19 slidable in a cylinder 20 which is filled with glycerine or similar fluid, not affected by changes in temperature.

A by-pass pipe 21 leads from one end of this cylinder to the other, with an adjustable control valve 22 interposed therein. In this manner the speed of flow of the glycerine from one end of the cylinder to the other can be regulated, and the speed of movement of the core 12 and hence the operation of the brake-valve to which said core is connected, will be governed accordingly. This allows the brakes to be put on as gently or as quickly as may be desired, and the train may be stopped in a given distance.

A normally closed switch 23 is interposed at a convenient place in the circuit. A voltmeter 24 may also be arranged in connection with the main circuit if desired.

In order to enable the engineer to test out his own system at any time, without of course affecting the system on any engine on the line, I run a wire 25 between the wires 5 and 7 beyond the solenoid, in which wire is interposed a normally open switch 26 of suitable type. It will therefore be seen that upon closing this switch a circuit through the whole system is closed, and if the same is in working order, the signal 9 will be actuated and the brakes applied. Should these results not obtain, the engineer will know something is wrong, and should investigate to locate the source of trouble.

The foregoing parts are substantially the same as I have already provided in the systems as set forth in the aforementioned patent and application for patent. It will therefore be seen that as long as the shoes 8 on the two engines are on separate sections of the rail 2, the respective main circuits on said engines will be open, since as above stated, the rails 1 and 2 are insulated from each other and hence there is no direct connection between contact 3 and shoe 8.

When, however, the engines approach so close to each other that the shoes 8 are both on the same rail 2, or one or the other is on the lapped portions of two such rails, a circuit is at once closed through both engine circuits, since both wires 5 are then connected through the rails 1, and both wires 7 through the unbroken stretch or rail 2.

The shunt circuit B comprises a fine wire 27 extending from the wire 7 adjacent the shoe 8 to a ground on the engine, which corresponds to a connection with the wire 5 at the contact 3. In said wire 27 is interposed an electromagnet 28 attracting an armature 29. This magnet, which as will be evident is energized as long as the main circuit is not broken, is arranged to be operated only by voltage, so that the current passing through has not sufficient strength to actuate the solenoid 11.

The auxiliary circuit C comprises a wire 30 grounded at one end on the engine and connected at its other end to the armature 29 with an auxiliary battery 31 interposed therein. Another wire 32 has on one end a contact adapted to be engaged by the armature 29 but spaced therefrom as long as the magnet 28 is energized. This wire is grounded on the engine at its other end, thereby having connection with the rails 1. Interposed in this wire 32 is a solenoid structure 33, a duplicate of the solenoid 11 and adjacent parts, and whose core 34 is connected to handle 13$^a$ on the same brake valve 14 to which the core 12 of the other solenoid is connected (see Fig. 2).

Beyond the solenoid 33 the wire 32 has an electromagnet 35 interposed therein, actuated by the amperage or full strength current in said wire. This magnet when energized attracts an armature 36, one end of which is connected to the wire 32 and the other end is adapted to contact, only when the magnet is energized, with the wire 37 of the shunt circuit D of which the armature 36 and connecting leg of wire 32 form a part. The end of wire 37 opposite to the armature is connected to the shoe 8 or otherwise connected with the third rail 2.

A switch 38 normally closed, is in said auxiliary circuit C at a suitable point, as well as a signal lamp 39, lit when said circuit is closed.

In operation if the main circuit A is broken at any point the magnet 28 will be deenergized, allowing the armature 29 to engage the wire 32. This will close the auxiliary circuit C, causing the solenoid 33 to be actuated and the brakes to be instantly applied through the valve 14 as effectually as though the main circuit were in operation. At the same time the magnet 35 is also energized, causing the armature 36 to contact with the wire 37 and closing the shunt circuit D from ground (or rails 1) to the shoe 8 or rail 2. This causes the same conditions to obtain, as far as another engine in the same block is concerned, as if the main circuit on the engine on which the shunt circuit is mounted were unbroken. This is because the main circuit of said other engine is closed from rail 2 to rails 1 through the circuit D, which electrically connects said rails, as will be evident.

The switches 23 and 38, which are located in the engine cab, are normally sealed in closed position by some person in authority at railway headquarters. The seals are to be broken only in case any danger has passed and the need for opening said switches is imperative. Such a contingency arises if two trains have approached each other in the same block and the brakes have thus been automatically applied, as above described, either by means of the main or auxiliary circuits. In such a case, before the trains or engines can be again moved, the brakes must of course be released. This can only be done by opening whichever circuit has caused the application of the brakes to be made and is holding the brakes applied.

My speed governor control, arranged in connection with the main circuit and controlling in each engine individually without any effect on any other engine, comprises separated leads 40 attached to the wires 5 and 7 of the main circuit A. These leads are electrically connected, so as to close the circuit through the main system irrespective of any closing of said circuit through the rails 1 and 2, by means of an arm 41 adapted to engage and contact with both leads 40 simultaneously. This arm is mounted in connection with a pendulum or other common form of governor such as conventionally represented at 42.

This governor is mounted on a shaft 43 having a bevel pinion 44 meshing with a bevel gear 45 mounted on an axle 4 of the engine. This governor operates in the usual manner, so that with an increase of speed of the shaft 43 above a predetermined maximum speed of the engine, the arm 41 will move to engage the leads 40, closing the main circuit and applying the brakes, as will be clear. As soon as the speed decreases to a point below said maximum, the arm 41 will drop clear of the leads 40 causing the brakes to be released, and so on.

From the foregoing description it will be readily seen that I have produced such a system as substantially fulfills the objects of the invention as set forth herein.

While this specification sets forth in detail the present and preferred construction of the system, still in practice such deviations from such detail may be resorted to as do not form a departure from the spirit of the invention, as defined by the appended claims.

Having thus described my invention what I claim as new and useful and desire to secure by Letters Patent is:

1. An automatic brake setting system for railway vehicles comprising normally open circuit means on separated vehicles, brake actuating means arranged in the circuits and operating when the circuits are closed, means causing said circuits to be automatically closed when the vehicles approach to within a predetermined distance of each other, and means on one vehicle operating in connection with the first named means for causing the circuit on the other vehicle to be closed even if the circuit on the one vehicle is internally broken.

2. An automatic brake setting system for railway vehicles comprising normally open circuit means on separated vehicles, brake actuating means arranged in the circuits and operating when the circuits are closed, means causing said circuits to be automatically closed when the vehicles approach to within a predetermined distance of each other, a normally open shunt circuit connected to the main circuit of one vehicle and operating when closed in connection with the first named means for causing the circuit on the other vehicle to be closed even if the circuit on the one vehicle is internally broken, and means caused by said breaking for closing the shunt circuit.

3. An automatic brake setting system for railway vehicles comprising normally open circuit means on separated vehicles, brake actuating means arranged in the circuits and operating when the circuits are closed, means causing said circuits to be automatically closed when the vehicles approach to within a predetermined distance of each other, and auxiliary brake actuating means mounted on one vehicle and operating automatically if the main circuit on said vehicle is internally broken.

4. An automatic brake setting system for railway vehicles comprising normally open circuit means on separated vehicles, brake actuating means arranged in the circuits and operating when the circuits are closed, means causing said circuits to be automatically closed when the vehicles approach to within a predetermined distance of each other, auxiliary brake actuating means mounted on one vehicle and operating automatically if the main circuit on said vehicle is internally broken, and circuit means closed only upon the operation of the auxiliary means and functioning in connection with the first named means for causing the main circuit on the other vehicle to be closed irrespective of the break in the main circuit of the one vehicle.

5. An automatic brake setting system for railway vehicles comprising normally open circuit means on separated vehicles, brake actuating means arranged in the circuits and operating when the circuits are closed, means causing said circuits to be automatically closed when the vehicles approach to within a predetermined distance of each other, an auxiliary circuit on the vehicle brake actuating means operated upon the closing of said auxiliary circuit, and means whereby said auxiliary circuit will be closed only if the main circuit is internally broken.

6. An automatic brake setting system for railway vehicles comprising normally open circuit means on separated vehicles, brake actuating means arranged in the circuits and operating when the circuits are closed, means causing said circuits to be automatically closed when the vehicles approach to within a predetermined distance of each other, an auxiliary circuit on the vehicle brake actuating means operated upon the closing of said auxiliary circuit, and means controlled by an internal break in the main circuit for causing said auxiliary circuit to be closed.

7. An automatic brake setting system for railway vehicles comprising normally open circuit means on separated vehicles, brake actuating means arranged in the circuits and operating when the circuits are closed, means causing said circuits to be automatically closed when the vehicles approach to within a predetermined distance of each other, an auxiliary circuit on the vehicle brake actuating means operated upon the closing of said auxiliary circuit, means controlled by an internal break in the main circuit for causing said auxiliary circuit to be closed, a normally open shunt circuit across the normally open gap of the main circuit, and means controlled by the closing of the auxiliary circuit for closing the shunt circuit.

In testimony whereof I affix my signature.

PETER W. MOSHER.